United States Patent
Martinez de Velasco Cortina et al.

(10) Patent No.: US 9,892,295 B2
(45) Date of Patent: Feb. 13, 2018

(54) SYSTEMS AND METHODS FOR CONNECTING PEOPLE WITH PRODUCT INFORMATION

(71) Applicant: Neology Inc., Poway, CA (US)

(72) Inventors: Francisco Martinez de Velasco Cortina, San Diego, CA (US); Manfred Rietzler, Marktoberdorf (DE)

(73) Assignee: Neology, Inc., Poway, CA (US)

(*) Notice: Subject to any disclaimer, the term of this patent is extended or adjusted under 35 U.S.C. 154(b) by 81 days.

(21) Appl. No.: 14/250,356

(22) Filed: Apr. 10, 2014

(65) Prior Publication Data

US 2014/0306806 A1 Oct. 16, 2014

Related U.S. Application Data

(60) Provisional application No. 61/811,649, filed on Apr. 12, 2013.

(51) Int. Cl.
*G06K 7/10* (2006.01)
*G06Q 30/02* (2012.01)
*G06K 17/00* (2006.01)

(52) U.S. Cl.
CPC ..... *G06K 7/10366* (2013.01); *G06K 7/10009* (2013.01); *G06K 17/00* (2013.01); *G06Q 30/02* (2013.01)

(58) Field of Classification Search
CPC ............. G06K 7/10366; G06K 7/0008; G06K 19/0723; G06K 19/07749; G06K 2017/0045; G06Q 30/02; G07C 9/00111
See application file for complete search history.

(56) References Cited

U.S. PATENT DOCUMENTS

| | | | | |
|---|---|---|---|---|
| 5,724,410 A | * | 3/1998 | Parvulescu | G08B 3/1033 340/313 |
| 2004/0214642 A1 | * | 10/2004 | Beck | A63F 13/02 463/40 |
| 2005/0099306 A1 | * | 5/2005 | Gilfix | A61H 3/061 340/573.1 |
| 2005/0099307 A1 | * | 5/2005 | Gilfix | A61H 3/061 340/573.1 |
| 2005/0167497 A1 | | 8/2005 | Fujii | |
| 2007/0027924 A1 | * | 2/2007 | Hopkins | G06Q 30/02 |
| 2007/0035400 A1 | * | 2/2007 | Lauper | G06Q 50/10 340/572.1 |
| 2007/0067290 A1 | * | 3/2007 | Makela | G06F 17/30041 |

(Continued)

OTHER PUBLICATIONS

International Search Report and Written Opinion, received in corresponding International Application No. PCT/US2014/034050, dated Aug. 25, 2014, 8 pages.

(Continued)

*Primary Examiner* — Sisay Yacob
(74) *Attorney, Agent, or Firm* — Procopio, Cory, Hargreaves & Savitch LLP

(57) ABSTRACT

A system for providing item information includes: a radio frequency identification (RFID) tag coupled to an item; and a mobile device comprising an RFID reader. The RFID tag includes stored information related to the item, and the RFID reader is configured to access the RFID tag, obtain the item information, and communicate the item information to a user.

19 Claims, 3 Drawing Sheets

(56) References Cited

U.S. PATENT DOCUMENTS

| | | | |
|---|---|---|---|
| 2007/0228140 A1* | 10/2007 | Kumagai | G06Q 30/02 235/375 |
| 2008/0074264 A1* | 3/2008 | Sharpe | H04L 67/20 340/572.1 |
| 2008/0191878 A1* | 8/2008 | Abraham | G06Q 30/0603 340/572.1 |
| 2009/0058647 A1* | 3/2009 | Dennard | G06Q 30/06 340/572.1 |
| 2009/0066516 A1* | 3/2009 | Lazo | G06K 19/0724 340/572.7 |
| 2009/0113513 A1* | 4/2009 | Dorney | G06Q 30/0255 725/135 |
| 2010/0090004 A1* | 4/2010 | Sands | G06Q 10/087 235/385 |
| 2010/0207737 A1 | 8/2010 | Park et al. | |
| 2010/0222041 A1* | 9/2010 | Dragt | G06Q 30/02 455/414.2 |
| 2011/0254687 A1* | 10/2011 | Arponen | H04M 1/72525 340/540 |
| 2012/0171995 A1 | 8/2012 | Krafzik et al. | |
| 2012/0317628 A1 | 12/2012 | Yeager | |
| 2012/0326847 A1* | 12/2012 | Strauman | H04M 1/72525 340/10.4 |

OTHER PUBLICATIONS

Supplementary European Search Report for EP Application No. 14782712 (7 pages).

\* cited by examiner

SYSTEMS AND METHODS FOR CONNECTING PEOPLE WITH PRODUCT INFORMATION

CROSS-REFERENCE TO RELATED APPLICATIONS

This application claims the benefit of U.S. provisional application No. 61/811,649 filed Apr. 12, 2013, the disclosure of which is hereby incorporated in its entirety by reference.

BACKGROUND

1. Technical Field

The various embodiments described herein are related to radio frequency identification (RFID), and more particularly to connecting people with product information using radio frequency communication techniques.

2. Related Art

Radio-frequency identification (RFID) is the wireless non-contact use of radio-frequency electromagnetic fields to transfer data for the purposes of automatically identifying and tracking tags attached to objects. Some tags require no battery and are powered and read at short ranges via magnetic fields (electromagnetic induction). Other tags use a local power source and emit radio waves (electromagnetic radiation at radio frequencies). The tags contain electronically stored information that may be read from up to several meters away. Unlike a bar code, a tag does not need to be within line of sight of the reader and may be embedded in the tracked object. An RFID tag can be affixed to an object and used to track and manage inventory, assets, people, etc. For example, RFID tags can be affixed to cars, computer equipment, books, mobile phones, etc.

RFID offers advantages over manual systems or use of bar codes. The tag can be read if passed near a reader, even if it is covered by the object or not visible. The tag can be read inside a case, carton, box or other container, and unlike barcodes, RFID tags can be read hundreds at a time. Bar codes can only be read one at a time using current devices.

RFID has been incorporated into mobile devices for payment and loyalty programs. Asset management is another area in which RFID has been implemented. Organizations are already using RFID tags combined with a mobile asset management solution to record and monitor the location of their assets, their current status, and whether they have been maintained. Other areas where RFID has been implemented include asset tracking, tolling, electronic vehicle registration, access control, contactless credit cards, etc.

Two common tag types are often seen, e.g., in the United States. The first common tag type is a high frequency (HF) tag that operates at 13.56 MHz. Such tags are used for RFID enabled passports and for near field communication (NFC) applications, which let mobile devices act as RFID readers and transponders. NFC capabilities are also being incorporated into contactless credit cards. The second common tag type is an ultra-high frequency (UHF) tag that operates in the 860-960 MHz band in the U.S.

UHF tags tend to work over longer ranges than HF tags. For example, a typical UHF tag can work at distances of several meters, whereas HF tags are typically limited to distances of under a meter and often much shorter ranges.

Because of the longer operating ranges, UHF tags are preferably used for supply chain management; however, adoption and wide scale deployment has been slow. On the other hand, when it comes to transactions such as purchasing transactions, shorter read ranges are preferable as a means to help keep transaction data secure by not broadcasting it over larger distances. Consequently, many mobile devices have high frequency, e.g., NFC capabilities built in so that the mobile device can be used for transacting.

SUMMARY

Apparatuses, systems, and methods for providing item information using an RFID enabled device are provided.

According to an aspect of the present inventive concept there is provided a system for providing item information. The system may include: a radio frequency identification (RFID) tag coupled to an item; and a mobile device comprising an RFID reader. The RFID tag includes stored information related to the item, and the RFID reader is configured to access the RFID tag, obtain the item information, and communicate the item information to a user.

According to another aspect of the present inventive concept there is provided a method for providing product information. The method may include: storing information related to an item in a radio frequency identification (RFID) tag; coupling the RFID tag to the item; reading the stored information related to the item from the RFID tag, and communicating the item information to a user.

Other features and advantages of the present inventive concept should be apparent from the following description which illustrates by way of example aspects of the present inventive concept.

BRIEF DESCRIPTION OF THE DRAWINGS

The above and other aspects and features of the present inventive concept will be more apparent by describing example embodiments with reference to the accompanying drawings, in which.

DETAILED DESCRIPTION

While certain embodiments are described, these embodiments are presented by way of example only, and are not intended to limit the scope of protection. The methods and systems described herein may be embodied in a variety of other forms. Furthermore, various omissions, substitutions, and changes in the form of the example methods and systems described herein may be made without departing from the scope of protection.

Figure 1:
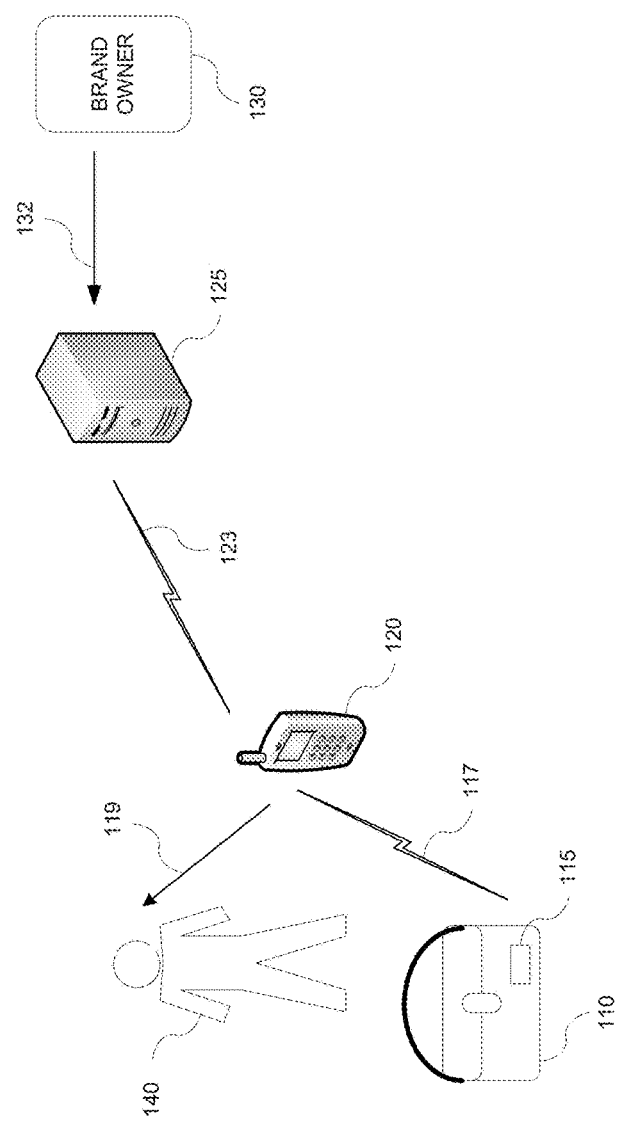
FIG. 1 is an illustration of a system for providing item information according to various example embodiments of the present inventive concept.

FIG. 1 is an illustration of an example system for providing item information to a user according to various example embodiments of the present inventive concept. As illustrated in FIG. 1, an item 110, for example, but not limited to, merchandise in a retail location, may be configured with an RFID tag 115 coupled to the item 110. The RFID tag 115 may be a passive tag or an active tag. The RFID tag 115 may be visible on the item 110 or may be embedded within the item 110 or the item packaging. The RFID tag 115 may store information, for example, but not limited to, an item description, price, available options, etc., related to the item 110.

Alternatively or additionally, the RFID tag 115 may enable a connection 123 to an information storage device 125, for example, but not limited to, a server, computer, or other information storage device, configured to provide information related to the item 110, by providing links to the information stored on the information storage device 125. Item information may be updated, for example, by a brand owner 130, by updating the information stored on the information storage device 125 without updating the information stored on the RFID tag 115.

The item information may be accessed by bringing an RFID enabled device 120, for example, a mobile device including an RFID reader, within range of the RFID tag 115 or by contacting the item 110 with the RFID enabled device. Device 120 can be a smartphone; viewable device, such as a smartwatch, a tablet, etc.

The item information may be evaluated to make purchasing decisions. For example, by making contact with the item using a RFID enabled device 120, for example, but not limited to, a mobile phone, tablet, or similar device, or bringing the RFID enabled device 120 within close proximity of the item information may be transmitted 117 to the RFID enabled device 120 by reading the RFID tag 115 and reproduced by the RFID enabled device 120 as audio information 119. By giving a voice to the objects, a closer relationship may be built up between the item 110 and a user 140 of the RFID enabled device 120 (i.e., a customer). Moreover, the item information may continue to be updated after the RFID tag 115 is coupled to the item, and even after a customer has purchased the item 110.

A brand owner 130 may create audio message streams 132 for item information and may assign a name and/or choose a male or female voice to provide messages. The audio message streams 132 may include, for example, but not limited to, greetings, basic chat, etc. The audio message streams 132 may be updated by the brand owner 130 to provide new messages to the customers.

Figure 2:
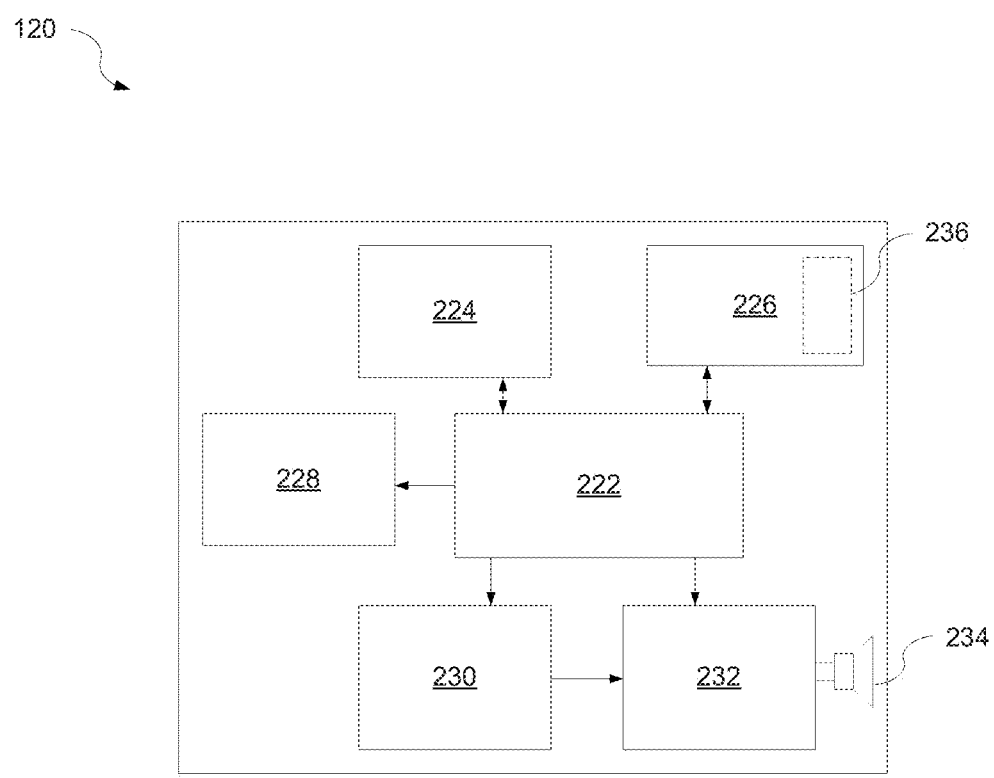
FIG. 2 is a block diagram illustrating an RFID enabled device according to various example embodiments of the present inventive concept.

FIG. 2 is a block diagram illustrating an RFID enabled device 120 according to various example embodiments of the present inventive concept. Referring to FIG. 2, the RFID enabled device 120 may include a processor 222, a storage 224, an RFID reader 226, a display unit 228, a speech converter 230, and audio reproduction unit 232, and an audio output device 234.

The processor 222 may be, for example, but not limited to, a microprocessor, a microcomputer, or other programmable device, and may be configured to control overall operation of the RFID enabled device 120. The storage 224 may be configured to store operational instructions executed by the processor for control of the RFID enabled device 120, as well as application programs and user data. In various example embodiments, the item information may be received from, for example, but not limited to, a server or other information storage device.

For example, the storage 224 may store an application program including instructions for causing the RFID enabled device 120 to communicate with the RFID tag 115 and/or the server 125 to retrieve information regarding an item 110 and convert the retrieved item information into an audio message reproduced to the user 140 by the RFID enabled device 120.

In various example embodiments, an RFID reader 226 included with the RFID enabled device 120 may be configured to read information related to the item 110 stored in the RFID tag 115. In various example embodiments, the RFID reader 226 of the RFID enabled device 120 may be an HF RFID reader. In various example embodiments, the RFID reader 226 of the RFID enabled device 120 may be both an HF and a UHF RFID reader. In various example embodiments, the dual HF and UHF capability may be incorporated in the RFID reader 226 of the RFID enabled device 120 with one dual-frequency integrated circuit 236.

The display unit 228 may be, for example, but not limited to, a liquid crystal display (LCD) or other video display. The speech converter 230 may be for example, an integrated circuit (IC) configured to convert text data to an audio signal. The audio reproduction unit 232 may be, for example, but not limited to, an amplifier configured to amplify the audio signal from the speech converter 320. In various example embodiments, the speech converter 230 and the audio reproduction unit 232 may be combined. The audio output device 234 may be, for example, a loudspeaker.

The RFID enabled device 120 may be configured to communicate the item information to a user 140 of the RFID enabled device 120. In various example embodiments, the item information may be displayed on the display unit 228 of the RFID enabled device 120 as, for example, but not limited to, text messages and/or as a graphical display. In various example embodiments, the RFID enabled device 120 may include a speech converter 230, an audio reproduction unit 232, and audio output device 234 to communicate the item information as speech. The speech converter 230 may be configured to convert the item information into speech. The audio reproduction unit 232 may be configured to reproduce the speech and output the reproduced speech via the audio output device 234.

In various example embodiments, the RFID tag 115 may alternatively or additionally include links, or address information for item information stored on a remote server 125. When the links or address information are read from the RFID tag 115 using the RFID enabled device 120, the information may cause the RFID enabled device 120 to access the item information from the remote server 125 and communicate the information to the user 140. The item information may include, for example, but not limited to, text messages, audio messages, picture, video, etc.

The RFID tag 115 may be a high frequency (HF) tag or an ultra-high frequency (UHF) tag. In various example embodiments, for example, but not limited to, supply chain management applications, the RFID tag 115 may be a UHF RFID tag.

Figure 3:
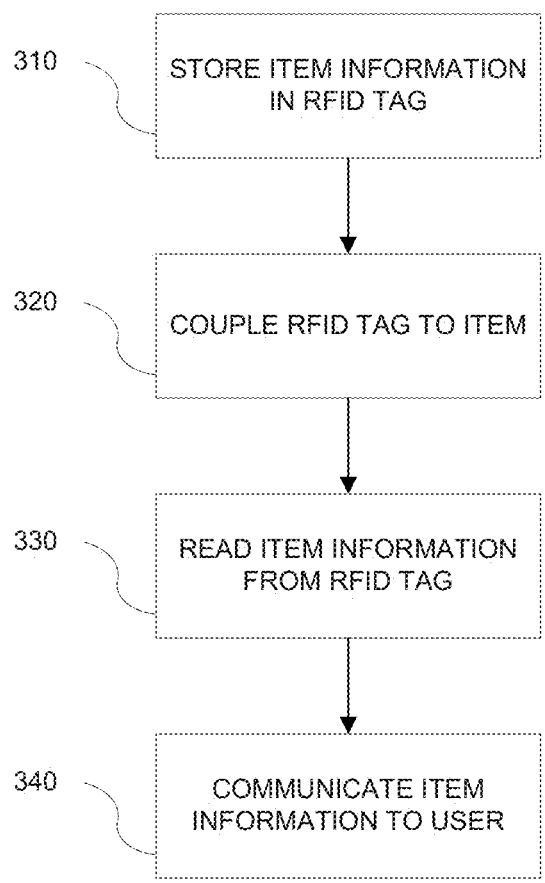
FIG. 3 is a flowchart illustrating a method for providing item information according to various example embodiments of the present inventive concept.

FIG. 3 is a flowchart illustrating a method according to various example embodiments of the present inventive concept. Referring to FIG. 3, information related to an item 110 may be stored in an RFID tag 115 (310). The item information may include, for example, but not limited to, an item description, price, available options, etc. Alternatively or additionally, item information stored on the RFID tag 115 may include links to all or a portion of the item information stored on an information storage device 125.

The RFID tag 115 may be coupled to the item 110 (320). The RFID tag 115 may be visible on the item 110 or may be embedded within the item 110 or the item 110 packaging. The item 110 may be, for example, but not limited to, merchandise in a retail location. The item information may be read from the RFID tag (330). For example, the item information may be read by bringing an RFID enabled device 120 into contact with the item 110 or by bringing an RFID enabled device 120 in close proximity to the item 110.

After the item information is read, the item information may be communicated to a user 140 (340). The item information may be displayed on the display unit 228 of the RFID enabled device 120 as, for example, but not limited to, text messages and/or as a graphical display. Alternatively or additionally, the item information may be communicated to the user 140 as speech.

The accompanying claims and their equivalents are intended to cover such forms or modifications as would fall within the scope and spirit of the protection. For example, the example apparatuses, methods, and systems disclosed herein can be applied wireless communication devices incorporating HF and/or UHF RFID reader capabilities. The various components illustrated in the figures may be implemented as, for example, but not limited to, software and/or firmware on a processor, ASIC/FPGA/DSP, or dedicated hardware. Also, the features and attributes of the specific example embodiments disclosed above may be combined in different ways to form additional embodiments, all of which fall within the scope of the present disclosure.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable storage medium or non-transitory processor-readable storage medium. The steps of a method or algorithm disclosed herein may be embodied in processor-executable instructions that may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

Although the present disclosure provides certain example embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

What is claimed is:

1. A system for providing item information, the system comprising:

an ultra-high frequency (UHF) radio frequency identification (RFID) tag coupled to an item, wherein the UHF RFID tag stores links to item information associated with the item stored on a server, wherein the item information stored on the server includes text messages audio messages and at least one of a picture and a video;

a high frequency (HF) RFID tag coupled to the item, wherein the HF RFID tag stores transaction information that can be used to purchase the item; and a mobile device comprising an RFID reader that comprises a dual frequency chip configured to read HF RFID tags and UHF RFID tags, an audio converter, a display and an audio output device, wherein the RFID reader is configured to access the UHF RFID tag and obtain the item information including the text messages, the audio messages and the at least one of the picture and the video stored on the server, wherein the audio converter is configured to convert the obtained text messages into audio messages, wherein the audio output device is configured to communicate the audio messages obtained from the server and the audio messages converted from the text messages to a user, wherein the display is configured to display the at least one of the picture and the video to the user, and wherein the RFID reader is configured to access the HF RFID tag and obtain the transaction information and use the transaction information in a purchasing transaction.

2. The system of claim 1, wherein the links stored in the RFID tag instruct the mobile device to access the item information from the server.

3. The system of claim 2, wherein the item information is updated on the server.

4. The system of claim 3, wherein at least a portion of the item information is stored on the server, and
the links stored in the RFID tag instruct the mobile device to access the portion of the item information from the server.

5. The system of claim 4, wherein the at least a portion of the item information is updated and stored on the server.

6. The system of claim 1, wherein the mobile device is further configured to communicate the item information via a text message.

7. The system of claim 1, wherein the mobile device is further configured to communicate the item information via a graphical display.

8. The system of claim 1, wherein the mobile device further comprises:
an audio reproduction unit configured to reproduce the item information from the associated audio message into an amplified audio message prior to communicating the audio message to the user.

9. The system of claim 8, wherein the audio output device is further configured to communicate the amplified audio message to the user.

10. The system of claim 8, wherein the audio output device is coupled to an output of the audio reproduction unit.

11. A method for providing product information, the method comprising:
storing information related to an item in an ultra-high frequency (UHF) radio frequency identification (RFID) tag, wherein the stored information includes a link to item information associated with the item stored on a server, and wherein the item information stored on the server includes a text message an audio message and at least one of a picture and a video;
storing transaction information that can be used to purchase the item in a high frequency (HF) RFID tag coupled to the item;
coupling the UHF and HF RFID tags to the item;
reading the stored information related to the item from the UHF RFID tag, wherein reading the stored information further obtains the item information including the text message the audio message and the at least one of the picture and the video stored on the server;
converting the obtained text message into an audio message;
communicating the audio message obtained from the server and the audio message converted from the text message to a user;
displaying the at least one of the picture and the video to the user; and
reading the transaction information from the HF RFID tag and using the transaction information in a purchasing transaction.

12. The method of claim 11, wherein reading the stored information related to the item from the RFID tag includes reading the stored link to the item information stored on the server, and
accessing the item information stored on the server.

13. The method of claim 12, wherein the item information is updated on the server.

14. The method of claim 11, wherein reading the stored information related to the item from the RFID tag includes reading the stored link to at least a portion of the item information stored on the server, and
accessing at least the portion of the item information stored on the server.

15. The method of claim 14, wherein the at least a portion of the item information is updated on the server.

16. The method of claim 11, further comprising communicating the item information via a text message.

17. The method of claim 11, further comprising communicating the item information via a graphical display.

18. The method of claim 11, further comprising:
reproducing the item information from the associated audio message into an amplified audio message prior to communicating the audio message to the user.

19. The method of claim 18, wherein the method further comprises communicating the amplified audio message to the user.

* * * * *